Figure 1:
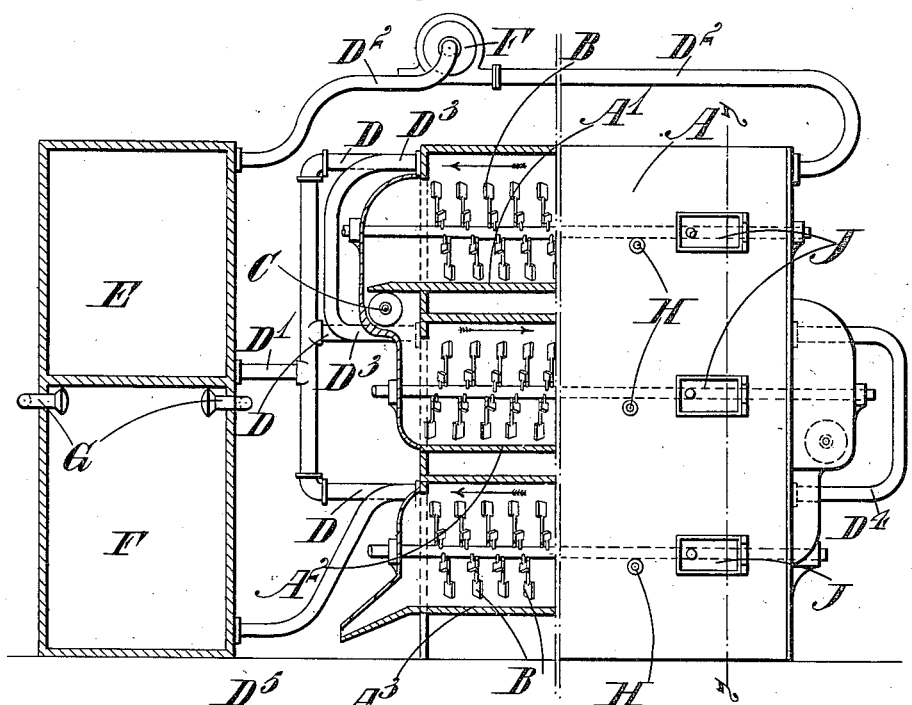

No. 841,657. PATENTED JAN. 22, 1907.
L. V. ATKINSON.
PROCESS OF TREATING REFRACTORY ORES.
APPLICATION FILED MAR. 26, 1906.

UNITED STATES PATENT OFFICE.

LESLIE VERO ATKINSON, OF CARSHALTON, ENGLAND.

PROCESS OF TREATING REFRACTORY ORES.

No. 841,657.　　　　Specification of Letters Patent.　　　　Patented Jan. 22, 1907.

Application filed March 26, 1906. Serial No. 308,159.

*To all whom it may concern:*

Be it known that I, LESLIE VERO ATKINSON, a subject of the King of England, residing at Carshalton, Surrey, England, have invented certain new and useful Improvements in or Relating to the Treatment of Refractory Ores, of which the following is a specification.

This invention relates to the treatment of refractory ores, and has special reference to a process for the recovery of metals from ores containing iron sulfids.

According to this invention the finely-divided ore is roasted at a comparatively low temperature and the gases given off by it during roasting are returned into the furnace in such a way as to act upon the ore. The admission of these gases which are brought back by means of return-flues is alternated with air preferably forced into the furnace under pressure.

The improved process is particularly applicable when it is desired to remove with the iron other metals—such, for example, as copper, nickel, and cobalt. These are sulfated at approximately the same time and temperature as the iron, and other metals—such as gold, silver, lead, and zinc—are retained in the gangue and can be recovered therefrom by any convenient process after the removal of the sulfates.

When silver is present in the ore, the use of salt or sea water is desirable to prevent loss of silver.

The sulfation of the metals is assisted according to this invention by spraying upon the roasting ore weak sulfuric or other acid. This weak acid may be obtained by condensing in the well-known way some of the gases given off during the roasting process.

The iron and copper pass into solution together and can be recovered separately by any suitable method. A variable percentage of lead, zinc, and silver when such metals are present is contained in and may be recovered from the same solution.

The iron sulfate is soluble in water, and consequently may be removed thereby; but I prefer to remove as many of the metals as possible together in an acid solution. However, I may employ for the removal of the iron or other sulfates formed by carrying out this invention or for the subsequent removal of the metals left in the gangue any of the various well-known reagents or methods suitable for the purpose.

It will be understood that the iron may be recovered in the form of a chlorid if the ore during the process is treated with salt, sea-water, or salt water, and in such cases weak hydrochloric acid might be used for the removal of the iron from the ore after the preliminary low-temperature roast.

The accompanying drawings illustrate diagrammatically and by way of example only one convenient construction of apparatus for carrying out this invention.

Figure 2:
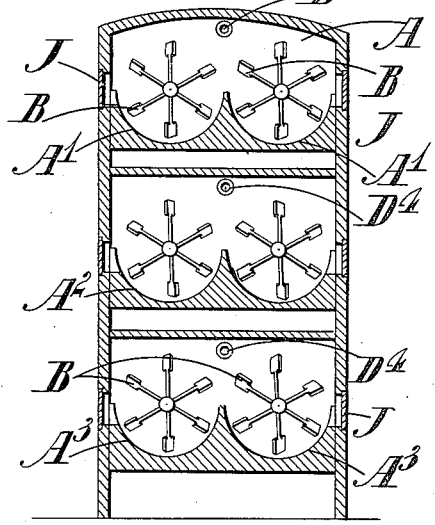

Figure 1 is a side elevation, partly in section; and Fig. 2, a transverse section on the line 2 2 of Fig. 1.

A is a furnace having three hearths $A'$, $A^2$, and $A^3$. Each of these hearths is double, as shown in Fig. 2, being formed of two approximately semicylindrical portions, each of which contains a conveyer B. The conveyers may be of any convenient form, but are preferably made as broken-bladed worms or are provided with paddle-like arms, so that while acting to move the ore along the hearths they do not hinder the air and gases from passing over and through it. The conveyer-shafts are mounted in bearings at the ends of the furnace and are suitably geared together. The gearing, however, may be of any convenient type and is not shown in the drawings.

The ore after passing over the top hearth $A'$ in the direction indicated by the arrow in Fig. 1 is ground or crushed by a roller C, placed, as shown in Fig. 1, within the furnace. Thence it passes to the hearth $A^2$ and is again crushed or ground before it reaches the lower hearth $A^3$.

The furnace is preferably gas-heated; but the arrangements are not shown, as they form in themselves no part of the present invention.

Pipes D lead from the space above each hearth to a common pipe $D'$, connecting them with a gasometer E. Through these pipes the gases given off by the ore during its roasting pass, and by means of a pipe $D^2$ and pump F they may be forced back again through the space above the top hearth $A'$. Thence they pass by way of a pipe $D^3$ to the space above the second hearth $A^2$, and then after passing through the pipe $D^4$, which conducts them to the lower hearth $A^3$, are finally led by the pipe $D^5$ to the condenser F. In this condenser the gases may be treated with water led in through spray-nozzles G.

Valves and dampers (not shown in the drawings) may be provided so that the passage of the gases through the various pipes or flues may be controlled, and provision is conveniently made so that the pipe D² between the gasometer E and the pump F, may be closed and air allowed to pass through the pump F to the furnace, so that the admission of the gases to the furnace may be alternated with air.

Spraying-nozzles are provided at various parts of the furnace, as at H, so that water or weak acid may be introduced onto the ore as it is being roasted. Like nozzles may be used for the introduction of steam.

The semicylindrical form of hearth is very convenient for carrying out the process and is preferably made of cast-iron coated, with the other parts of the furnace which are exposed to heat, with a suitable protective cement.

Doors J or other means of regulating the draft through the furnace are provided, and hot water may be obtained for the after treatment of the ores by placing pipes through which water may circulate at any suitable part of the furnace.

It it to be understood that although the apparatus above described is particularly suitable for the process according to this invention, yet that process may be carried out in a furnace of any convenient type.

What I claim as my invention, and desire to secure by Letters Patent, is—

1. A process for the treatment of refractory sulfid ores consisting in roasting the ore, returning the gases given off by it into the furnace and alternating the admission of such gases into the furnace with air substantially as and for the purpose set forth.

2. A process for the treatment of refractory sulfid ores consisting in roasting the ore, returning the gases given off by it into the furnace, alternating the admission of such gases with air and spraying weak acid upon the ore in the furnace substantially as and for the purpose set forth.

3. A process for the treatment of refractory sulfid ores consisting in roasting the ore, returning the gases given off by it into the furnace, alternating the admission of such gases with air, spraying weak acid upon the ore in the furnace and removing the sulfated metals from the roasted ore together in an acid solution substantially as and for the purpose set forth.

4. A process for the treatment of refractory sulfid ores consisting in roasting the ore in a furnace having a plurality of hearths, moving the ore mechanically from one hearth to the other, grinding it during its passage to expedite the sulfation of the metals and returning the gases given off by the ore into the furnace substantially as and for the purpose set forth.

5. A process for the treatment of refractory sulfid ores consisting in roasting the ore in a furnace having a plurality of hearths, moving the ore mechanically from one hearth to the other, grinding it during its passage to expedite the sulfation of the metals, returning the gases given off by the ore into the furnace and alternating the admission of such gases with air substantially as and for the purpose set forth.

6. A process for the treatment of refractory sulfid ores consisting in roasting the ore in a furnace having a plurality of hearths, moving the ore mechanically from one hearth to the other, grinding it during its passage to expedite the sulfation of the metals, returning the gases given off by the ore into the furnace, alternating the admission of such gases with air and spraying weak acid upon the ore in the furnace substantially as and for the purpose set forth.

7. A process for the treatment of refractory sulfid ores consisting in roasting the ore in a furnace having a plurality of hearths, moving the ore mechanically from one hearth to the other, grinding it during its passage to expedite the sulfation of the metals, returning the gases given off by the ore into the furnace, alternating the admission of such gases with air, spraying weak acid upon the ore in the furnace and removing the sulfated metals from the roasted ore together in an acid solution substantially as and for the purpose set forth.

In testimony whereof I have signed my name to this specification in the presence of two subscribing witnesses.

LESLIE VERO ATKINSON.

Witnesses:
HARRY B. BRIDE, Jr.,
ARCHD. J. FRENCH.